Sept. 24, 1968
A. N. LEEDAHL
3,402,829
PORTABLE STACKER FOR HAY AND THE LIKE
Filed Oct. 23, 1965
2 Sheets-Sheet 1
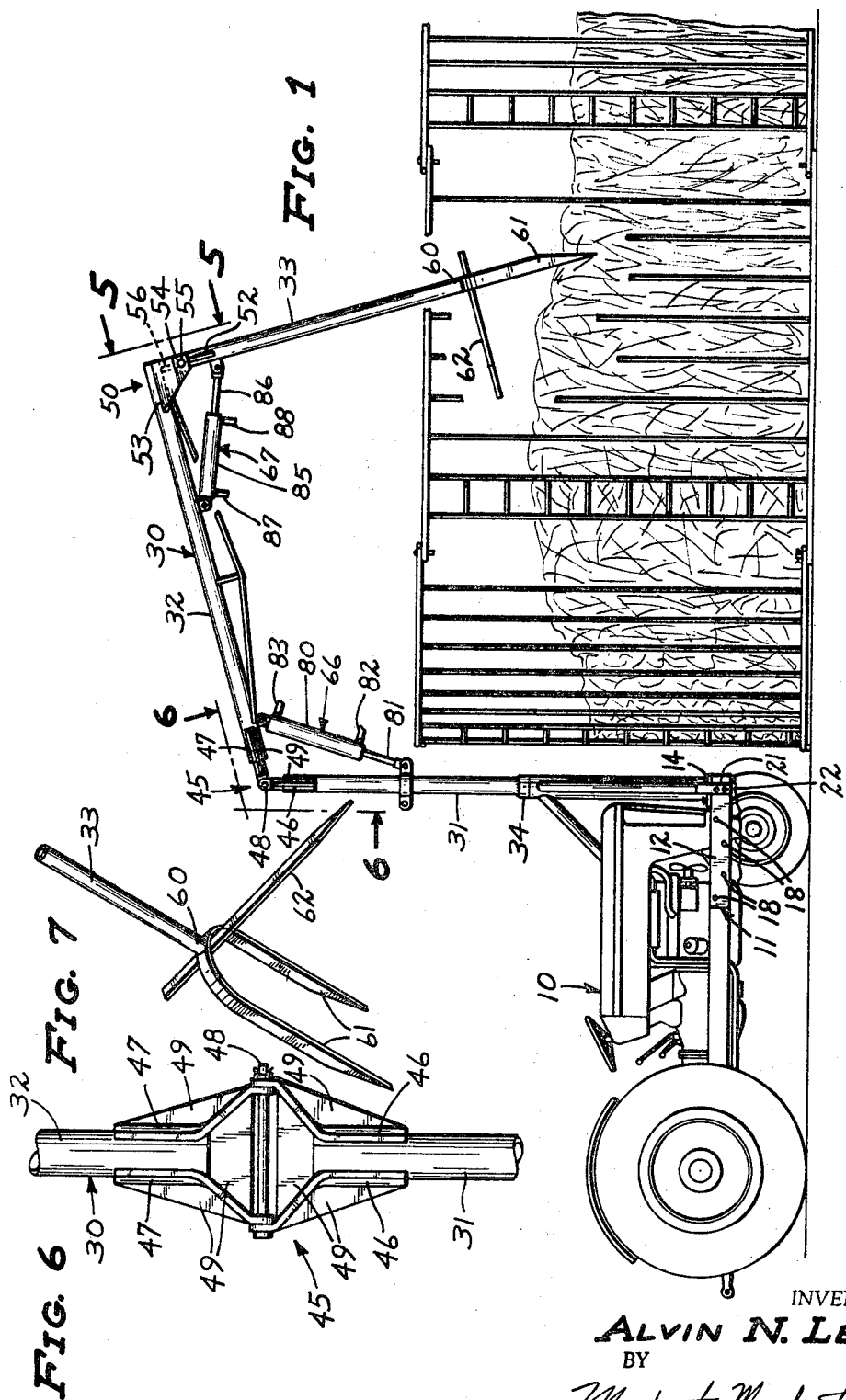
INVENTOR.
ALVIN N. LEEDAHL
BY
Merchant, Merchant & Gould
ATTORNEYS Sept. 24, 1968   A. N. LEEDAHL   3,402,829
PORTABLE STACKER FOR HAY AND THE LIKE
Filed Oct. 23, 1965   2 Sheets-Sheet 2
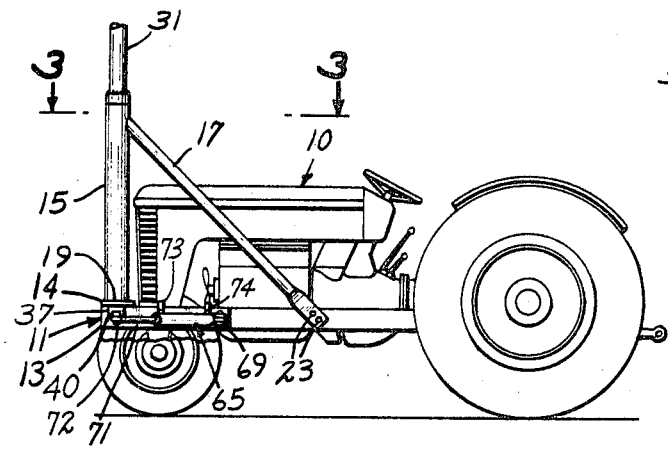
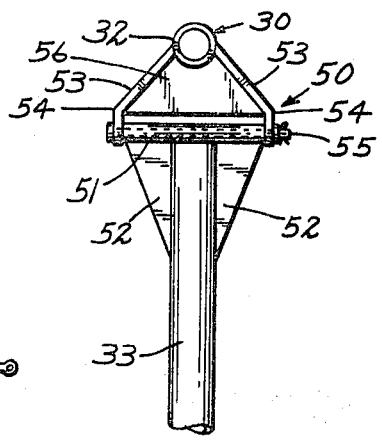
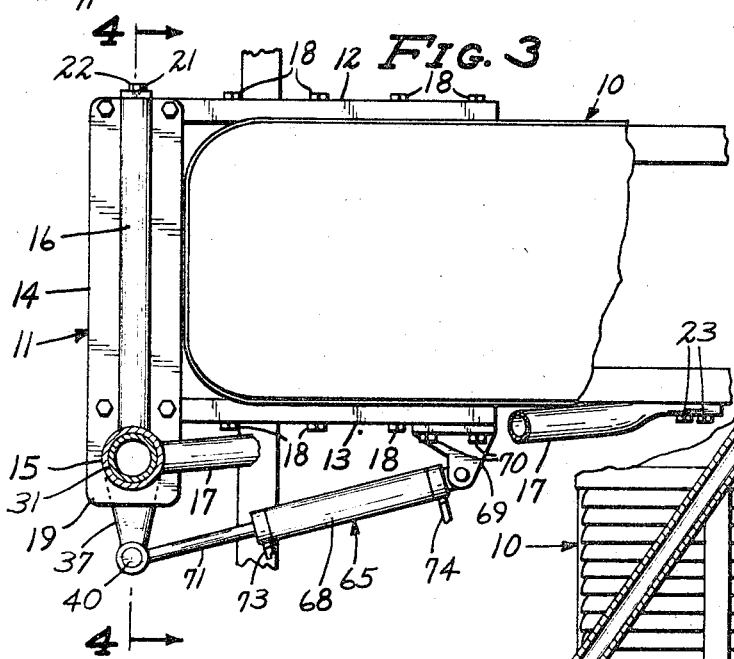
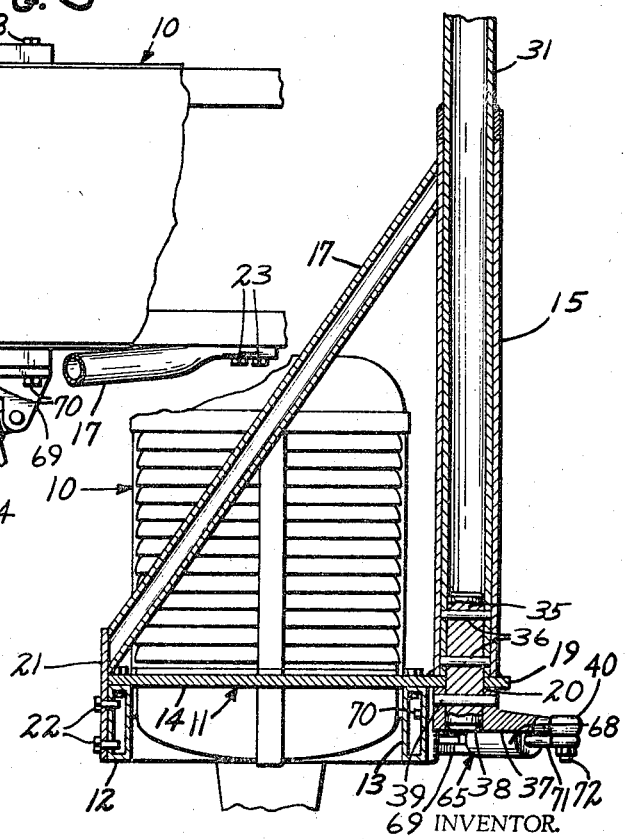
INVENTOR.
ALVIN N LEEDAHL
BY
Merchant, Merchant & Gould
ATTORNEYS

United States Patent Office 3,402,829
Patented Sept. 24, 1968

3,402,829
PORTABLE STACKER FOR HAY AND THE LIKE
Alvin N. Leedahl, Leonard, N. Dak. 58052
Filed Oct. 23, 1965, Ser. No. 503,340
1 Claim. (Cl. 214—5)

ABSTRACT OF THE DISCLOSURE

Apparatus adapted to be attached to the front end of a tractor including a first generally vertical segment, a second segment having one end pivotally attached to the upper free end of the first segment, and a third segment having one end pivotally attached to the outwardly extending free end of the second segment. A first hydraulic cylinder is connected between a frame mounted in a stationary position on the tractor and the first segment to impart rotary movements about the longitudinal axis hereof. A second hydraulic cylinder is connected between the first segment and the second segment to rotate the second segment about the pivotal connection thereof to the first segment. A third hydraulic cylinder is connected between the second and third segments for imparting rotary movement of the third segment about the pivotal connection thereof to the second segment. The third segment has attached to the free end thereof a pair of tines projecting outwardly generally along the longitudinal axis of the third segment and a third tine projecting perpendicular to the first two tines for engaging hay or the like in spreading and packing movements. The longitudinal dimensions of the three segments are such that spreading and packing movements can be imparted to hay within relatively high stack forming devices and the like.

---

The present invention pertains to a portable stacker for hay and the like which is adapted to be connected to a vehicle such as a tractor and more particularly to apparatus operable from the ground level for spreading and packing loose hay and the like into stacks.

The stacking of loose hay, straw, and the like has always been considered one of the more menial tasks of farmers. The stacking of these loose materials requires the presence of a human being at the top of the stack to spread and pack the material into a stack which will withstand the elements. Stacking is extremely difficult and hard work and, in addition, the person at the top of the stack must work under conditions which are extremely hot and dusty. Besides the difficulty of the labor and the uncomfortable conditions, there is a degree of danger involved in stacking loose materials since there is some tendency for the materials to slide and the laborer is positioned many feet above ground. Because of the foregoing disadvantages of the stacking operation, there is a tendency for the laborer, in many instances, to insufficiently perform his task.

The present invention includes an arm made up of a plurality of segments pivotally connected together in end to end relationship and attached at one end to a vehicle such as a tractor or the like. The free end of the arm has attached thereto a plurality of tines for engaging the loose material to be stacked. In general at least one tine is positioned substantially parallel to the longitudinal axis of the segment comprising the free end of the arm and a second tine is positioned substantially perpendicular thereto. The parallel tine or tines are utilized for moving the hay horizontally in spreading movements and the perpendicular tine is utilized in vertical packing movements.

Remotely controllable power means, which may be for example dual acting, hydraulic, piston equipped cylinders, a plurality of single acting, hydraulic, piston equipped cylinders mounted in opposing relationship, or any other devices which will provide a force in either of opposite directions, are connected between adjoining segments of the arm and between the end of the arm attached to the vehicle and the attaching apparatus. The power means between adjoining segments provide vertical movement of the free end of the arm as well as longitudinal movement and the power means between the end of the arm and the attaching apparatus provides rotary movement of the arm or transverse movement of the free end thereof.

Thus, the tines at the end of the arm are remotely controllable for movement in substantially any direction and an operator situated on the vehicle can control the tines in spreading movements and packing movements. A single operator, therefore, from a relatively safe and comfortable position can produce stacks of hay or other loose material which are well constructed and uniform. Not only is the amount of labor involved in the stacking process greatly reduced by the present device but the amount of time required to perform the task and the people involved is in many instances greatly reduced.

It is an object of the present invention to provide a new and improved portable stacker for hay and the like.

It is a further object of the present invention to provide a portable stacker for hay and the like which operates from a vehicle such as a tractor.

It is a further object of the present invention to provide a portable stacker for hay and the like which completely eliminates the necessity of a laborer at the top of the stack.

It is a further object of the present invention to provide a portable stacker for hay and the like which is remotely controllable in spreading and packing movements to produce substantially uniform and improved stacks.

These and other objects of this invention will become apparent to those skilled in the art upon consideration of the accompanying specification, drawings, and claims.

Referring to the drawings, wherein like characters indicate like parts throughout the figures:

FIG. 1 is a side view of the present invention mounted on a tractor and in operating position;

FIG. 2 illustrates the side opposite of the illustration in FIG. 1 with parts thereof removed;

FIG. 3 is an enlarged sectional view as seen from the line 3—3 in FIG. 2, parts thereof broken away;

FIG. 4 is a sectional view as seen from the line 4—4 in FIG. 3, parts thereof broken away;

FIG. 5 is an enlarged view as seen from the line 5—5 in FIG. 1;

FIG. 6 is an enlarged view as seen from the line 6—6 in FIG. 1; and

FIG. 7 is an enlarged view in perspective of the packing and spreading tines at the free end of the arm.

In the figures the numeral 10 generally designates a tractor having a frame, generally designated 11, fixedly attached thereto. The frame 11 consists of a pair of beams 12 and 13, a flat cross piece 14, an upright hollow cylindrical member 15 and a pair of braces 16 and 17. The beams 12 and 13 are mounted substantially horizontally on the right and left side respectfully of the tractor 10 by means of a plurality of bolts 18. The beams 12 and 13 have a substantially rectangular shaped cross-section and extend a short distance past the front of the tractor 10. The flat cross piece 14 is fixedly attached to the upper surface of each of the beams 12 and 13 at the front of the tractor 10 with a short portion 19 thereof extending past the beam 13 to the left of the tractor 10. The portion 19 of the cross piece 14 has an opening 20 therethrough with a diameter substantially smaller than the inside diameter of the cylindrical member 15. The cylindrical member 15 is fixedly attached by some means such as welding or the like to the upper surface of the portion 19 and coaxial with the opening 20 therein. The brace 16 is attached to the cylindrical member 15 adjacent the upper end thereof and extends downwardly and across the front of the tractor to the outer edge of the beam 12. The lower end of the brace 16 is fixedly attached to a substantially vertical plate 21 which is in turn securely attached to the beam 12 by means of bolts 22. The second brace 17 is attached to the cylindrical member 15 adjacent the upper end thereof and extends rearwardly and downwardly until it intersects the frame of the tractor 10 where it is securely affixed by means of bolts 23.

The moving portion of the portable stacker consists of an elongated arm generally designated 30 which includes segments 31, 32 and 33. Segment 31 is a hollow cylindrical member having an outside diameter slightly smaller than the inside diameter of the cylindrical member 15. One end of the segment 31 is fitted coaxially within the cylindrical member 15, the amount inserted therein being limited by a collar 34 fixedly attached to the segment 31 by some means such as welding or the like. The end of the segment 31 may also rest on the upper surface of the portion 19 of the cross piece 14 for additional support. A solid cylindrical member 35 having an outside diameter slightly smaller than the inside diameter of the segment 31 is fitted coaxially in the lower end of the segment 31 and fixedly attached there by some means such as pins 36. The member 35 extends downwardly through the opening 20 and the lower end thereof is coaxially engaged in an opening 38 in one end of a crank arm 37. The member 35 is fixedly attached to the crank arm 37 for rotation therewith by some means such as pin 39. The other end of the crank arm 37 has a knuckle 40 thereon which will be explained presently.

The upper end of the segment 31 is pivotally attached to one end of the segment 32 by means of a joint generally designated 45 and illustrated in detail in FIG. 6. Each of the segments 31 and 32 has mating bifurcated ends comprised of two substantially similar pairs of members 46 and 47 respectfully. The members 46 and 47 have a portion which extends parallel with the outer surface of the segments 31 and 32 for a short distance and which is fixedly attached thereto by welding or the like. Each of the segments 46 and 47 then extends outwardly for a short distance to form the two branches of the bifurcation, with the two members 46 extending slightly farther than the two members 47. The ends of each of the member 46 and 47 then extend parallel to the segments 31 and 32 and have mating openings therethrough perpendicular to the longitudinal axes of the segments 31 and 32. A pin 48 is inserted through the openings in the members 46 and 47 to pivotally attach the segment 32 to the segment 31. The members 46 and 47 each have webbing 49 between the angles bent therein and across the bifurcation to add strength to the joint.

One end of the segment 33 is connected to the unattached end of the segment 32 by a joint generally designated 50 and illustrated in detail in FIG. 5. A relatively short hollow cylindrical member 51 having an outer diameter substantially smaller than the outer diameter of the segment 33 is fixedly attached to the end thereof with its longitudinal axis perpendicular to the longitudinal axis of the segment 33. A pair of gussets 52 are fixedly attached to the corners between the cylindrical member 51 and the segment 33 to add strength thereto. The cylindrical member 51 forms a knuckle of the joint 50, the remainder of the joint 50 being formed by a pair of right triangularly-shaped members 53. The triangularly-shaped members 53 are fixedly attached to the segment 32 so that they extend outwardly therefrom and the right angle is adjacent the unattached end thereof. The angular corner 54 of the triangularly-shaped members 53 extending outwardly from the segment 32 have the extreme corner truncated, then parallel to each other and spaced apart slightly farther than the length of the cylindrical member 51. A mating hole is drilled in each of the parallel sections 54 of the triangularly-shaped members 53 and a pin 55 is inserted through the holes and the cylindrical member 51 to complete the joint 50. The triangularly-shaped members 53 are strengthened by a webbing 56 fixedly attached therebetween.

Fixedly attached to the free end 60 of the segment 33 are means for engaging the hay or other loose material during spreading and packing movements. The engaging means in this embodiment consists of a pair of tines 61 which extend substantially parallel to the longitudinal axis of the segment 33 and are spaced apart to form a bifurcation at the free end 60 thereof. In addition, the engaging means has a third tine 62 which is attached to the free end 60 of the segment 33 and lies substantially perpendicular to the longitudinal axis thereof. The tines 61 engage the hay during spreading or substantially horizontal movements of the arm 30 while the tine 62 provide substantial surface during packing or vertical movements of the arm 30. It should be understood that many embodiments of this engaging means might be employed by those skilled in the art and the scope of this invention should not be limited by the particular embodiment illustrated.

The arm 30 is activated by remotely controllable power means which in this embodiment consists of three dual acting, hydraulic, piston equipped cylinders 65, 66 and 67. The hydraulic cylinder 65 has a body 68 and a connecting shaft 71, which is connected to a piston (not shown) in the body 68. The hydraulic cylinder 65 is connected between the frame 11 and the end of the first segment 31 as illustrated in FIGS. 3 and 4. One end of the body 68 of the hydraulic cylinder 65 is connected to the beam 13 by an angularly-shaped member 69. One side of the angularly-shaped member 69 is fixedly attached to the beam 13 by means of bolts 70 and the other side extends outwardly substantially perpendicular to the longitudinal axis of the beam 13. The outwardly extending portion of the angular member 69 has an opening therethrough and the end of the body 68 is bolted therein. The shaft 71 which is connected to the piston contained within the body 68 of the hydraulic cylinder 65 has a boss at the end thereof for receiving a bolt 72 therethrough. The upper end of the bolt 72 has a ball thereon which fits within the knuckle 40 of the crank arm 37 and pivotally attaches the shaft 71 to the crank arm 37. The hydraulic cylinder 65 is dual acting, which means that the shaft 71 can be forced in either direction along its longitudinal axis by applying fluid under pressure to either of a pair of inputs 73 and 74. When fluid under pressure is applied to the inlet 73 the piston and the connected shaft 71 are forced toward the right end of the body 68, referring to FIG. 3, and the crank arm 37 turns the segment 31 counterclockwise. When the fluid under pressure is applied to the inlet 74 the piston and the connected shaft 71 are forced toward the left end of the body 68, referring to FIG. 3, and the crank arm 37 turns the segment 31 in a clockwise direction.

The hydraulic cylinder 66 has a body 80 and a connecting shaft 81, which is connected to a piston (not shown) in the body 80. One end of the body 80 of the hydraulic cylinder 66 is pivotally attached to the segment 32 adjacent the joint 45. The connecting shaft 81 of the hydraulic cylinder 66 is pivotally attached to the segment 31 adjacent the joint 45. The hydraulic cylinder 66 has a pair of inputs 82 and 83 which drive the piston and the connecting shaft 81 in either direction along the longitudinal axis thereof. Referring to FIG. 1 when a fluid under pressure is applied to the input 82 of the hydraulic cylinder 66 the piston and the connecting shaft 81 are driven toward the upper end of the body 80 and the segment 32 of the arm 30 is rotated clockwise about the joint 45, or downwardly. When a fluid under pressure is applied to the input 83 of the hydraulic cylinder 66 the piston and connecting shaft 81 are forced toward lower end of the body 80 and the segment 32 is rotated in a counterclockwise direction about the joint 45, or upwardly.

The hydraulic cylinder 67 has a body 85 and a connecting shaft 86, which is connected to a piston (not shown) in the body 85. One end of the body 85 is pivotally attached to the segment 32 adjacent the joint 50. The protruding end of the connecting shaft 86 is pivotally attached to the segment 33 adjacent the joint 50. The body 85 of the hydraulic cylinder 67 has a pair of inputs 87 and 88 adapted to have fluid under pressure applied thereto. When fluid under pressure is applied to the input 87 the piston and the connecting shaft 86 are forced toward the right end of the body 85, referring to FIG. 1, and the segment 33 is rotated in a counterclockwise direction about the joint 50. When a fluid under pressure is applied to the input 88 the piston and the connecting shaft 86 are forced toward the left end of the body 85, referring to FIG. 1, and the segment 33 is rotated in a clockwise direction.

While connections to the three hydraulic cylinders 65, 66 and 67 are not illustrated for simplicity in the illustrations, it should be understood that the tractor 10 will have a fluid pump in communication with a fluid source attached thereto. Conduits for carrying fluid under pressure are attached to the various inputs 73, 74, 82, 83, 87 and 88 and controls for applying pressure to the various inlets are conveniently situated on the tractor 10. It should be understood that power means other than hydraulic cylinders 65, 66 and 67 might be utilized by one skilled in the art, such as air operated cylinders, mechanical screws, or the like, and it is intended that all such innovations be included within the scope of this invention. Thus, an operator positioned on the tractor 10 can control the arm 30 in substantially any direction for initiating spreading and packing movements so that loose material such as hay and the like can be stacked into substantially uniform stacks with a minimum of effort.

While I have shown and described a specific embodiment of this invention, further modifications and improvements will occur to those skilled in the art. I desire it to be understood, therefore, that this invention is not limited to the particular form shown and I intend in the appended claim to cover all modifications which do not depart from the spirit and scope of this invention.

What is claimed is:
1. A portable stacker for hay and the like comprising:
(a) a frame adapted to be connected to a vehicle such as a tractor or the like;
(b) an arm including a first segment pivotally attached adjacent one end to said frame with the free end of said first segment extending generally vertically upwardly for rotary movement about the longitudinal axis;
(c) said arm further including a second segment pivotally attached adjacent one end to the free end of said first segment with the free end of said second segment extending generally outwardly transverse to the longitudinal axis of said first segment;
(d) said arm further including a third segment pivotally attached adjacent one end to the free end of said second segment with the free end of said third segment extending generally downwardly;
(e) first remotely controllable power means attached between said first segment and said frame for imparting rotary movements to said first segment about the longitudinal axis thereof;
(f) second remotely controllable power means attached between said first and second segments for imparting pivotal packing movements to the free end of said second segment about an axis perpendicular to and adjacent the free end of said first segment;
(g) third remotely controllable power means attached between said second and third segments for imparting pivotal spreading movements to the free end of said third segment about an axis perpendicular to and adjacent the free end of said second segment; and
(h) means attached to the free end of said third segment, including a plurality of tines at least one of which lies substantially parallel to the longitudinal axis of said third segment and at least one of which lies substantially perpendicular to the longitudinal axis of said third segment, for engaging said hay or the like during spreading and packing movements of said arm.

References Cited

UNITED STATES PATENTS

| 3,319,813 | 5/1967 | Beyea | 214—133 |
| 747,986 | 12/1903 | Layne | 294—55.5 |
| 2,674,385 | 4/1954 | Stauth. | |

FOREIGN PATENTS

| 160,813 | 7/1964 | U.S.S.R. |
| 86,570 | 11/1958 | Denmark. |
| 1,167,313 | 7/1958 | France. |

HUGO O. SCHULZ, *Primary Examiner.*

G. F. ABRAHAM, *Assistant Examiner.*